(12) United States Patent
Nation

(10) Patent No.: US 9,790,994 B2
(45) Date of Patent: Oct. 17, 2017

(54) DEVICE TO RETAIN LUBRICANT IN A LUBRICATING ASSEMBLY AND IMPLEMENTATION THEREOF

(71) Applicant: Howden Roots LLC, Wilmington, DE (US)

(72) Inventor: Cory Alfred Nation, Connorsville, IN (US)

(73) Assignee: Howden Roots LLC, Wilmington, DE (US)

( * ) Notice: Subject to any disclaimer, the term of this patent is extended or adjusted under 35 U.S.C. 154(b) by 256 days.

(21) Appl. No.: 14/556,169

(22) Filed: Nov. 30, 2014

(65) Prior Publication Data
US 2015/0308506 A1    Oct. 29, 2015

Related U.S. Application Data

(60) Provisional application No. 61/985,153, filed on Apr. 28, 2014.

(51) Int. Cl.
| | |
|---|---|
| *F16C 33/66* | (2006.01) |
| *F01M 9/06* | (2006.01) |
| *F16N 7/26* | (2006.01) |

(52) U.S. Cl.
CPC ........... *F16C 33/6651* (2013.01); *F01M 9/06* (2013.01); *F16C 33/6685* (2013.01); *F16N 7/26* (2013.01)

(58) Field of Classification Search
CPC .... F15C 33/6651; F16C 33/6685; F01M 9/06
(Continued)

(56) References Cited

U.S. PATENT DOCUMENTS

| | | | |
|---|---|---|---|
| 126,624 A | 5/1872 | Coffee | |
| 217,667 A | 7/1879 | Cary | |

(Continued)

FOREIGN PATENT DOCUMENTS

| | | |
|---|---|---|
| BE | 442640 A | 10/1914 |
| BE | 505519 A | 9/1951 |

(Continued)

OTHER PUBLICATIONS

International Search Report and Written Opinion mailed Aug. 7, 2015 for PCT/.US2015/027880 filed Apr. 28, 2015.
(Continued)

*Primary Examiner* — William E Dondero
*Assistant Examiner* — Mark K Buse
(74) *Attorney, Agent, or Firm* — Edell, Shapiro & Finnan, LLC

(57) ABSTRACT

A lubricating assembly that is configured as part of a lubricating system that flings, or slings, fluid lubricants about the interior of rotating machinery. In one embodiment, the lubricating assembly includes a bearing clamp member with a clamp body having an outer peripheral edge that has an annular profile that partially circumscribes a longitudinal axis. The annular profile can have first annular section with a first clamp surface and a second clamp surface disposed in opposing relation about a centerline and spaced apart from one another to form a first annular gap. At the bottom of the clamp body, the bearing clamp member is configured with a peripheral wall that bounds a reservoir region. This configuration allows the fluid lubricants to gravity feed through the first annular gap into the reservoir region to retain a volume of the captured lubricant to lubricate moving parts of the lubricating system.

17 Claims, 11 Drawing Sheets

(58) Field of Classification Search
USPC .......................................................... 184/11.1
See application file for complete search history.

(56) References Cited

U.S. PATENT DOCUMENTS

| | | |
|---|---|---|
| 589,597 A | 9/1897 | Freeman |
| 1,262,798 A | 4/1918 | Huebotter |
| 1,341,080 A | 5/1920 | Scholes |
| 1,345,903 A | 7/1920 | Vincent |
| 1,367,674 A | 2/1921 | Spence |
| 1,569,404 A | 1/1926 | Smith |
| 2,074,980 A | 3/1937 | Christensen |
| 2,669,322 A | 2/1954 | Brown |
| 2,929,663 A | 3/1960 | Hoeltje |
| 2,972,903 A | 2/1961 | Lee |
| 3,144,097 A | 8/1964 | Ebert |
| 3,325,232 A * | 6/1967 | Pabst .................... F16C 33/78 384/467 |
| 3,847,249 A | 11/1974 | Oehring |
| 4,231,266 A | 11/1980 | Nishikawa et al. |
| 4,523,118 A | 6/1985 | Cunningham |
| 4,648,485 A | 3/1987 | Kovaleski |
| 4,701,060 A | 10/1987 | Gu |
| 4,964,489 A | 10/1990 | Patel |
| 5,321,951 A | 6/1994 | Falls et al. |
| 5,369,952 A | 12/1994 | Walters |
| 5,724,934 A | 3/1998 | Faraci et al. |
| 7,124,857 B2 | 10/2006 | Gekht et al. |
| 7,524,112 B2 * | 4/2009 | Gerez ................... F01D 21/045 384/101 |
| 7,625,126 B2 | 12/2009 | Peters et al. |
| 2013/0084035 A1 * | 4/2013 | Williams ............ F16C 33/6659 384/472 |
| 2015/0308306 A1 | 10/2015 | Nation |
| 2015/0308307 A1 | 10/2015 | Nation |

FOREIGN PATENT DOCUMENTS

| | | |
|---|---|---|
| DE | 1525909 B1 | 9/1970 |
| GB | 760817 A | 11/1956 |
| JP | S54-47049 A | 4/1979 |
| JP | H01-305103 A | 12/1989 |
| JP | H07-11924 A | 1/1995 |
| JP | 09023613 A | 1/1997 |
| JP | H0923613 A | 1/1997 |
| JP | 2004-132319 | 4/2004 |

OTHER PUBLICATIONS

Search Report for PCT/US2015/027953 dated Jul. 31, 2015.
Search Report for PCT/US2015/027868 dated Jul. 31, 2015.

* cited by examiner

DEVICE TO RETAIN LUBRICANT IN A LUBRICATING ASSEMBLY AND IMPLEMENTATION THEREOF

CROSS-REFERENCE TO RELATED APPLICATIONS

This application claims the benefit of priority to U.S. Provisional Application Ser. No. 61/985,153, filed Apr. 28, 2014, entitled "LUBRICATING MEMBERS, LUBRICATING ASSEMBLY, AND LUBRICANT DISPERSAL SYSTEM COMPRISED THEREOF", the entire contents of which are incorporated herein by reference.

BACKGROUND

This disclosure relates generally to lubricating systems found on compressors and machinery that can pressurize a working fluid and, more specifically, to an improved bearing clamp member that forms a reservoir to maintain a volume of lubricant.

Most industrial machinery incorporate a myriad of moving parts that are necessary for the machinery to perform its intended functions. Compressors, for example, include many parts that are in contact and move (e.g., rotate, translate, etc.) relative to other parts, often at high speeds and/or under heavy loads. Parts that operate under these conditions for long periods of time can wear, which can eventually cause failures that interrupt operation of the machinery. To avoid such problems, compressors will utilize lubricants such as oils, greases, and like substances that can reduce friction between moving parts. The lubricants can help to avoid breakdown of the moving parts. Nominally, an effective lubricating fluid management design is required to disperse the lubricant to the rotating components and collect it for further use.

One particular lubricating fluid management design is a splash lubricating oil system. Examples of these systems have a shaft and a flat plate body (or "slinger") having a circular or disc shape and a rolled peripheral edge. In operation, the shaft rotates the slinger to pass the rolled peripheral edge through the reservoir of lubricant. Rotation of the slinger generates centrifugal action that effectively transfers, or slings, the lubricant from the rolled peripheral edge. This action splashes the lubricant randomly on the interior surfaces of the compressor. In some applications, a guide member may be utilized to catch lubricant that falls back down toward the lubricant system.

BRIEF DESCRIPTION OF THE INVENTION

This disclosure describes improvements to members found in splash lubricating oil systems. These improvements provide features that can enhance performance, extend useful life, simplify manufacture, and make the members more amenable to consistent fabrication constraints (e.g., tolerances). As noted more below, at least one improvement provides embodiments of a clamp member that is configured to collect lubricant near critical parts and/or components of the lubricating system. This clamp member can form part of a passive, gravity-assisted lubricant return mechanism, which captures more lubricant that falls onto and/or proximate the clamp member than similar parts in conventional splash lubricating oil systems.

In one aspect, the embodiments can have an outer peripheral edge with an annular profile that at least partially circumscribes a longitudinal axis. The annular profile comprises a first annular section defining a first lubricant inlet zone formed between a first clamp surface and a second clamp surface. The first clamp surface and the second clamp surface are disposed in opposing relation about a centerline and spaced apart from one another to form a first annular gap. In one example, the clamp body further comprises a bore configuration defining a first bore and a second bore aligned on the longitudinal axis, the first bore and the second bore having, respectively, a first diameter and a second diameter that is larger than the first diameter so as to form a peripheral wall that bounds a reservoir region at a bottom of the clamp body. This configuration allows the fluid lubricant to gravity feed through the first annular gap into the reservoir region. In this way, the clamp body can retain a volume of the captured fluid lubricant to lubricate the moving parts during operation of the lubricating system.

BRIEF DESCRIPTION OF THE DRAWINGS

Reference is now made briefly to the accompanying drawings, in which.

Figure 1:
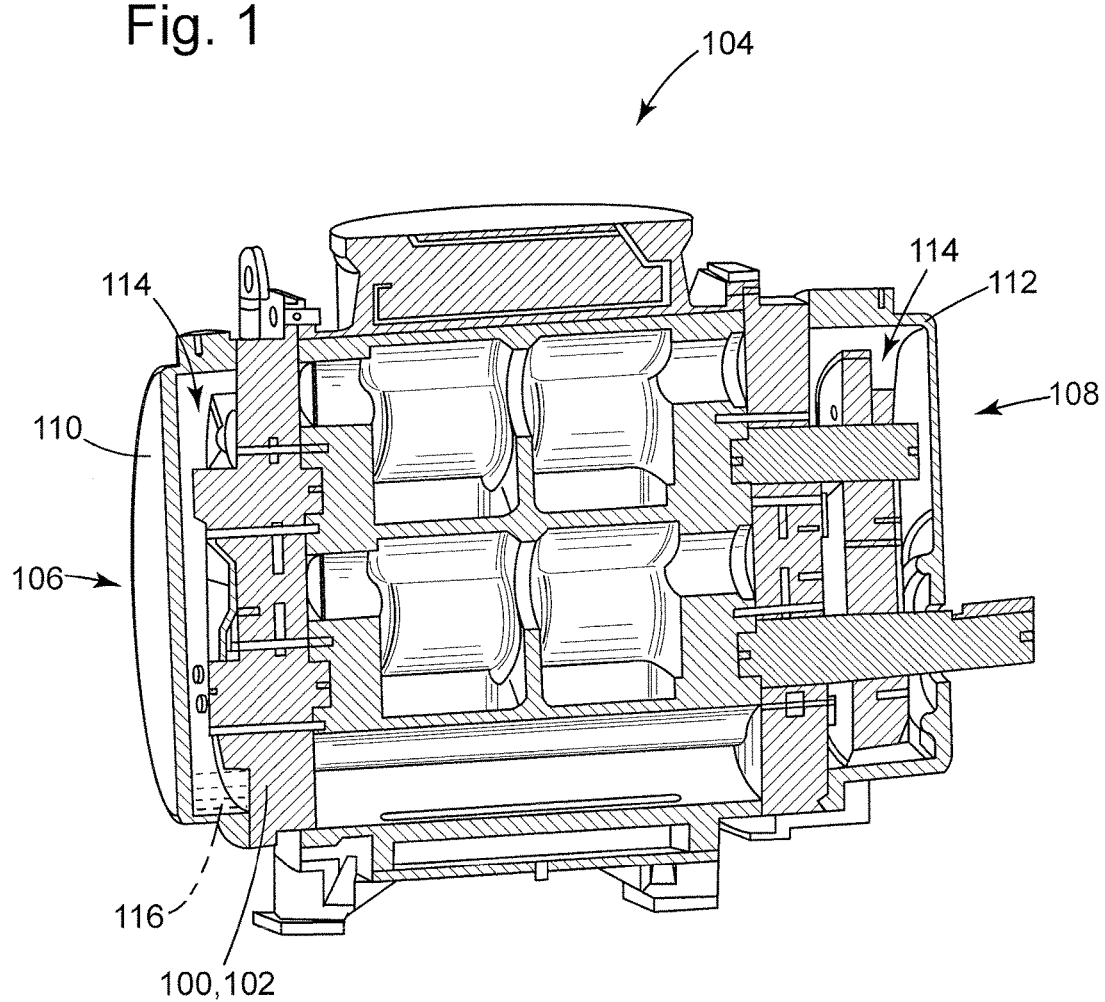
FIG. 1 depicts a cross-section of an exemplary embodiment of a lubricating system as part of an example of compressor, shown illustratively as a blower.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

The embodiments herein incorporate improvements that address certain problems found in conventional lubricating systems for use with compressors. As used herein, the term "compressor" describes machinery (including compressors and blowers) that acts on a working fluid, for example, to pressurize the working fluid to distribute on a process line. Examples of the process lines may be found in various applications including chemical, petro-chemical, resource recovery and delivery, refinery, and like sectors and industries. However, this disclosure does not foreclose use of the improvements, in whole or in part, in applications that can benefit from the distribution of lubricant that arises from the embodiments contemplated herein.

Notably, after multiple blowers failed in the field, resulting in expensive warranty claims, an engineering analysis was undertaken of several conventional lubricating systems, including 3-D element modeling, to determine root causes for the failures and to identify design modifications that would address the problems. Evidence from this analysis suggested that the bearing elements found in the lubricating system may not receive sufficient oil lubrication under all operating conditions.

In this regard, the discussion below describes improvements to one or more members of the lubricating system to address this shortfall in oil lubrication. At a high level, these improvements enhance the ability of the lubricating system to catch, direct, and retain lubrication at and/or near the bearing elements (e.g., roller bearings). Specifically, the discussion below describes embodiments of a clamp member that functions, inter alia, as a bearing clamp, a fluid catcher, and an oil retention device. These embodiments find use, for example, in splash lubrication systems that disperse lubricant throughout rotating machinery and like equipment. In one implementation, the clamp member is configured to funnel fluid lubricant proximate the rolling bearing elements. This configuration can include a front dam (also a "first peripheral wall") that forms a reservoir region to retain fluid lubricant and, consequently, provide regular lubrication to the bearing elements. Additionally, the clamp member is configured to receive multiple fasteners (e.g., cap screws) to secure the bearing elements to a bearing carrier. This configuration results in a more even stress distribution and, in combination with the improved lubrication retaining features, a longer bearing life.

FIG. 1 generally depicts an exemplary embodiment of a lubricating assembly 100 as seen in a cross-sectional view of a compressor. The lubricating assembly 100 is part of a lubricating system 102 found herein in a blower 104. In connection with the illustrated embodiment, the blower 104 has a first side 106 and a second side 108, each of which can incorporate a cover member (e.g., a first cover member 110 and a second cover member 112). The cover members 110, 112 may form a chamber 114 that can house a fluid 116, typically a lubricant (and/or friction reducing substance) with viscosity suitable for lubricating parts of the blower apparatus 104. On the first side 106, the lubricating system 102 resides proximate the lower part of the chamber 114 to locate one or more parts of the lubricant assembly 100 in contact with the fluid 116.

Examples of the lubricating system 102 are also known as "oil slinger" systems and/or "splash lubrication oil systems." As noted herein, these names are synonymous of systems that operate rotating components to move, or "sling," lubricant (or other fluids) from a lower part of the chamber 114 to an upper part of the chamber 114. This action disperses the lubricant onto components (e.g., gears, bearings, etc.) that require lubricant to reduce friction and avoid wear and premature breakdown. The lubricating assembly 100 is configured to capture and retain some of the lubricant that falls back down toward the bottom of the chamber 114 (FIG. 1). These configurations direct the lubricant into the interior components of the lubricating system 102, thereby increasing the availability of lubricant to maintain appropriate lubrication of components during operation of the lubricating system 102.

Figure 2:
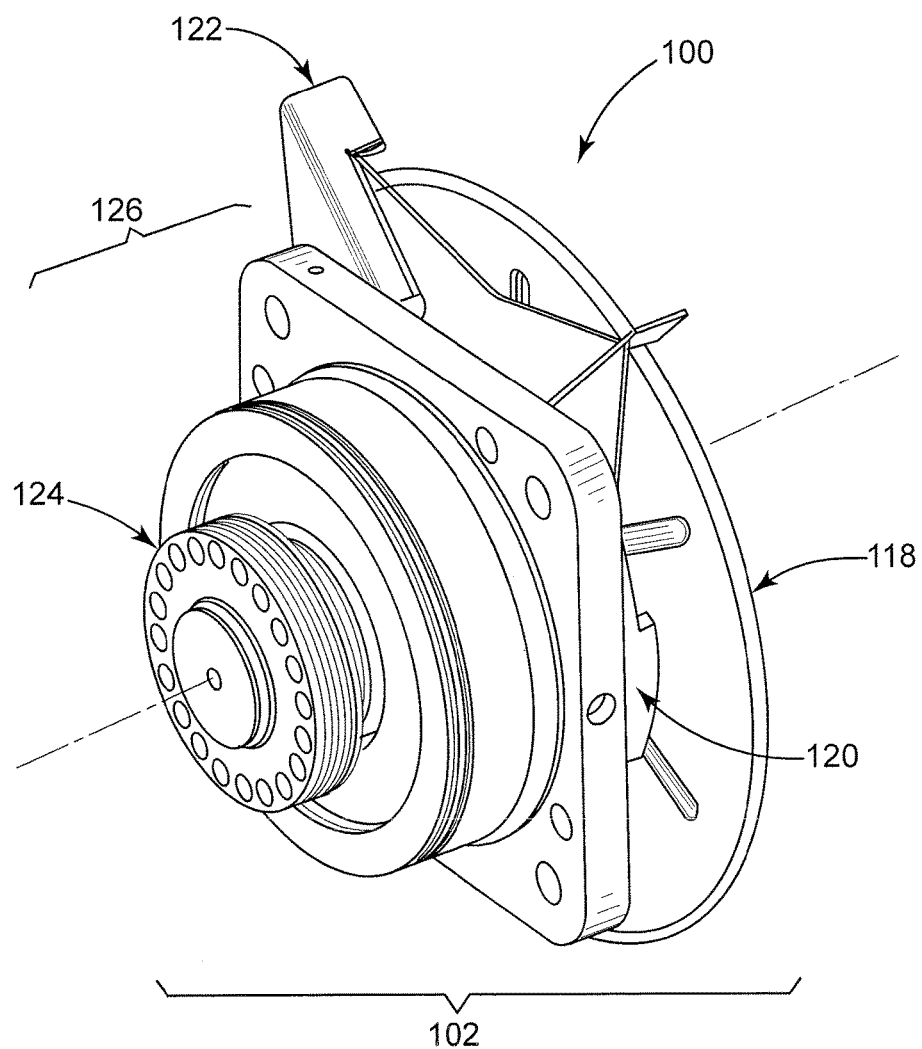
FIG. 2 depicts a perspective view of an exemplary embodiment of a lubricating system for use on the compressor of FIG. 1.
Figure 3:
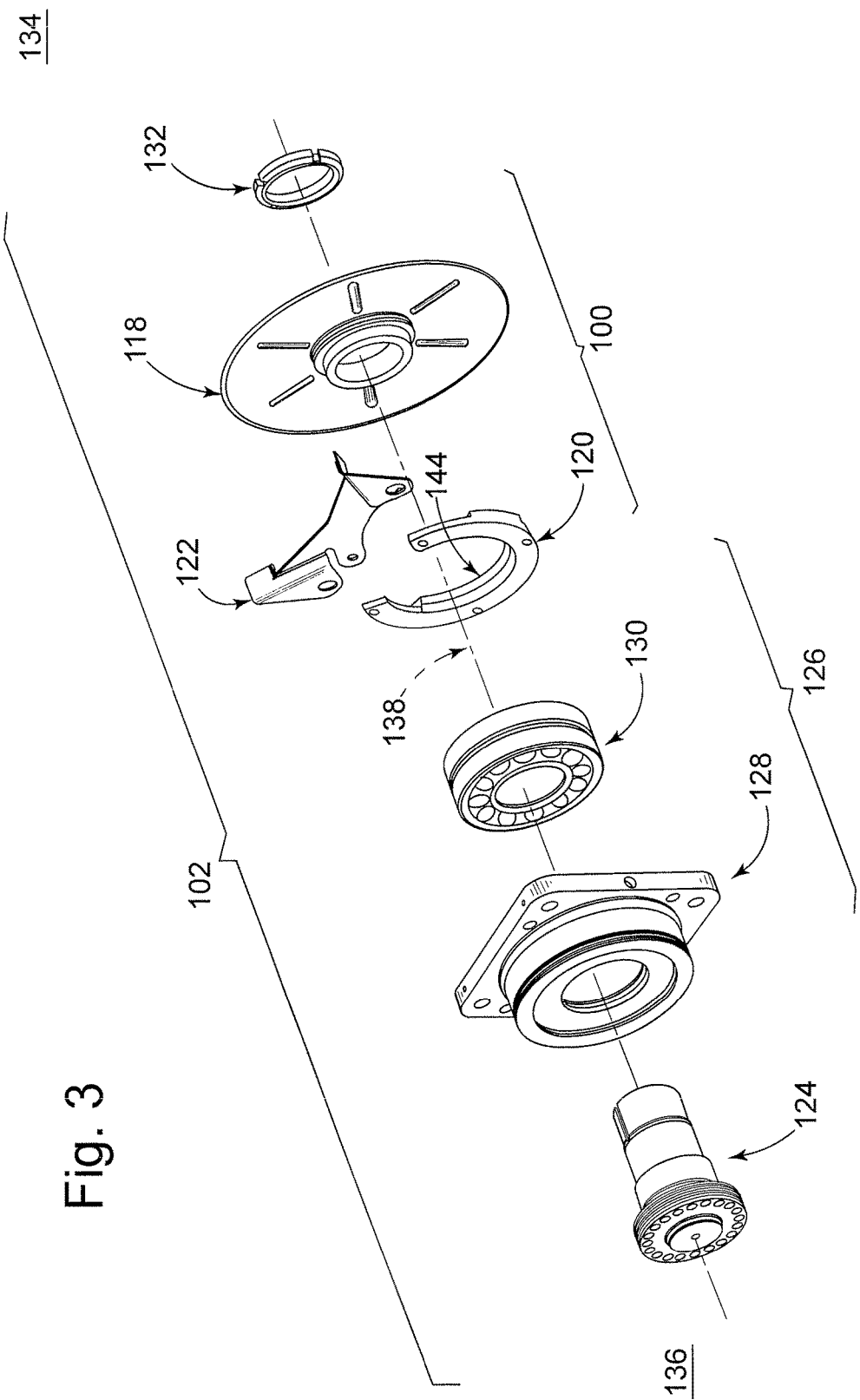
FIG. 3 depicts the lubricating system of FIG. 2 in exploded form.

FIGS. 2 and 3 depict the lubricating assembly 100 separated from the blower 104 (FIG. 1) to highlight some additional features. FIG. 2 depicts a perspective view of an exemplary embodiment of the lubricating assembly 100. FIG. 3 depicts the lubricating assembly 100 in exploded form, still implemented as part of and shown together with the lubricating system 102.

Referring to FIGS. 2 and 3, the lubricating assembly 100 can include a slinger member 118, a bearing clamp member 120, and a lubricant guide member 122. The lubricating system 102 may include a shaft member 124 and a bearing assembly 126. In one example, the lubricant guide member 122 is configure to couple with the bearing clamp member 120 in position between the slinger member 118 and the bearing assembly 126. As best shown in FIG. 3, the bearing assembly 126 can include a bearing carrier member 128 and a bearing member 130. The lubricating system 102 can further include a locking member 132, such as a peripheral lock nut. For reference, the lubricating assembly 100 and lubricating system 102 are shown to have a front side 134 (also, "first side 134"), a back side 136 (also, "second side 136"), and a longitudinal axis 138 extending therethrough. The designation of the terms "front side" and "back side," however, also translate to individual components, e.g., the bearing clamp member 120 and the lubricant guide member 122, as indicated during the discussion herein. Likewise, use of the longitudinal axis 138 can extend to one or more of the other components of the lubricating assembly 100, as necessary. body In one implementation, the shaft member 124 has a first end, a second end, and an axis that aligns with the longitudinal axis 138. The shaft member 124 can insert into one or more components. This feature positions each of the slinger member 118, the bearing clamp member 120, and the components of the bearing assembly 126 on the shaft member 124 in alignment with the axis. On the front side 134, the first end of the shaft member 124 is typically exposed to accept the locking member 132, which engages the first end of the shaft member 124 to secure the parts of the lubricating system 102 together. The second end of the shaft member 124 can receive a belt and/or other drive mechanism. During operation of the lubricating system 102, the drive mechanism can rotate the shaft member 124 about the longitudinal axis 138. The shaft member 124, in turn, rotates the slinger member 118, which picks up lubricant from the bottom of the chamber 114 (FIG. 1) and slings the lubricant into the rest of the machinery.

Figure 4:
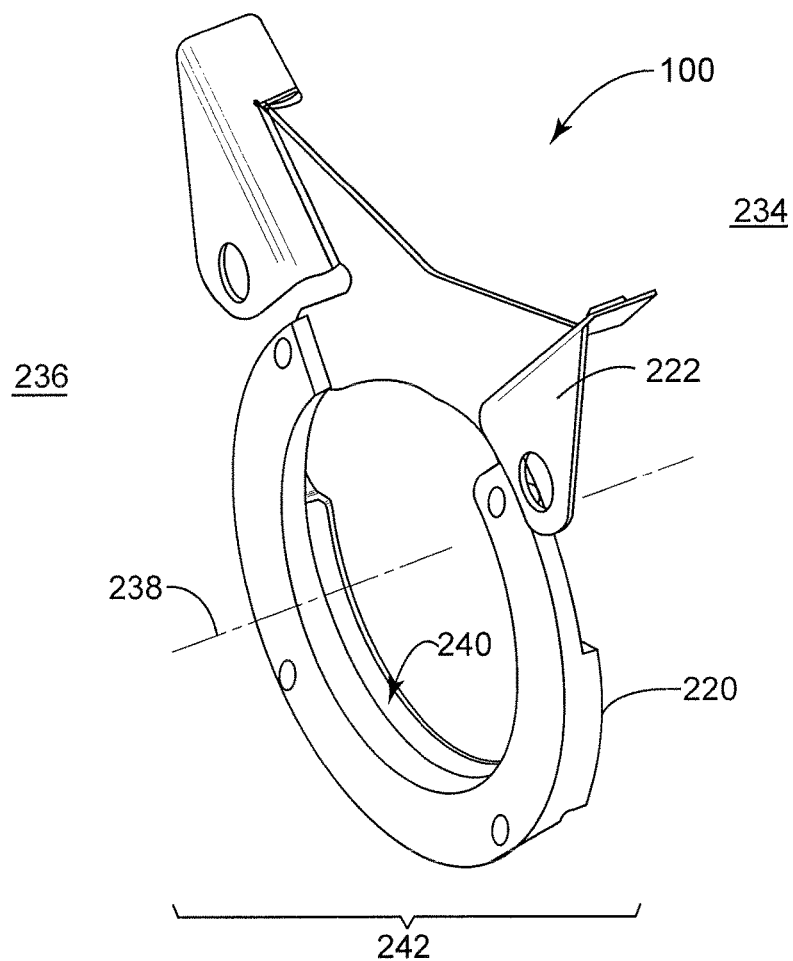
FIG. 4 depicts a perspective view of the lubricating assembly of FIG. 2 with one construction of a lubricant reservoir component.

FIG. 4 depicts the back side 236 of the lubricating assembly 100. Several members including, for example, the slinger member (e.g., slinger member 118 of FIGS. 2 and 3) are removed in this view for clarity. In FIG. 4, the bearing clamp member 220 includes a reservoir region 240. The lubricant guide member 222 is configured to couple at the top of the bearing clamp member 220. This configuration of the bearing clamp member 220 and the lubricant guide member 222 forms a lubricant reservoir component 242. As noted above, the lubricant reservoir component 242 leverages the construction of the lubricant guide member 222 to capture lubricant that does not adhere to components and falls back down toward the bottom of the chamber 114 (FIG. 1). This construction further directs the lubricant to flow downwardly towards the top of the bearing clamp member 220. As shown in FIG. 4, the bearing clamp member 220 may have sloped and/or angled surfaces that can also direct captured lubricant toward the interior of the bearing clamp member 220 and into the reservoir region 240, which is configured to retain a volume of the captured lubricant. In this way, the lubricant reservoir component 242 can maintain a consistent, effective supply of lubricant in the reservoir region 240 to lubricate the shaft member 124 (FIGS. 2 and 3) and/or bearing member 130 (FIGS. 2 and 3).

Figure 5:
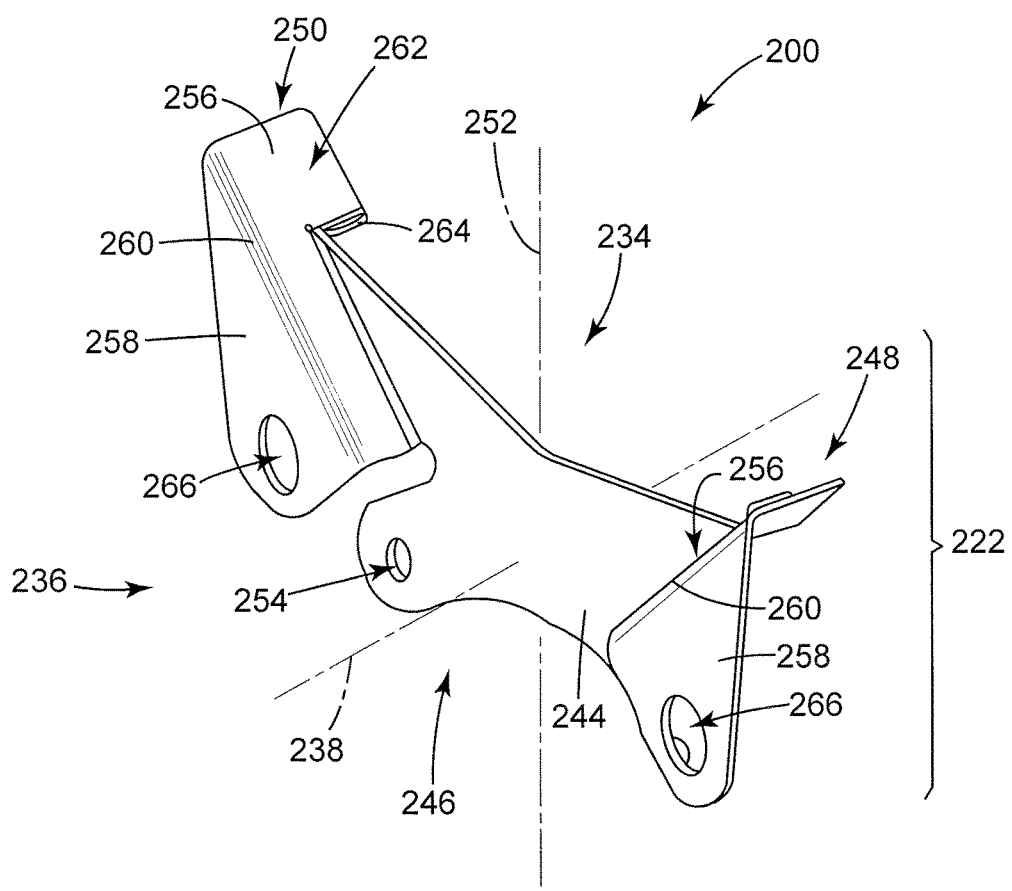
FIG. 5 depicts a perspective view of an exemplary embodiment of a lubricating assembly with focus on an example of a lubricant guide member.

FIG. 5 depicts a perspective view of an example of the lubricant guide member 222. The lubricant guide member 222 includes a body member 244 having a central portion 246 and a pair of peripheral, or side, members (e.g., a first side member 248 and a second side member 250). The body member 244 also defines a centerline 252 extending radially from the longitudinal axis 238 and bisecting the body member 244. The side members 248, 250 can be disposed on either side of the centerline 252. As illustrated, the body member 244 may be thin (i.e., formed of one or more thin sheets of material) and substantially planar so as to minimize volume. The body member 244 further includes a primary attachment feature 254 that is useful to mate and/or adjoin the lubricant guide member 222 to components of the lubricating system 102 (FIGS. 2 and 3). In one example, the primary attachment feature 254 comprises one or more thru-holes or openings that penetrate the body member 244. These through-holes can be equally spaced on opposite sides of the centerline 252, although the position of these through-holes can also match corresponding holes found on other components. For example, when incorporated into the lubricating assembly 100 (FIG. 2) and/or the lubricant reservoir component 242 (FIG. 4), the primary attachment feature 254 can be configured to allow the body member 244 to couple with the bearing clamp member 220 via fasteners (e.g., bolts), for example, at points on each side of the first annular gap in the annular profile of the clamp body. In one construction, the body member 244 can reside transverse (e.g., perpendicular) to the longitudinal axis 238 and the thru-holes can align with mating holes in the bearing clamp member 220 (FIG. 4).

As also shown in FIG. 5, the side members 248, 250 can include a first member 256 and second member 258 that couple with one another at an edge 260. The first member 256 extends transversely away from the body member 246 along the longitudinal axis 238. In one example, the first member 256 is perpendicular to the central portion 246 within reasonable manufacturing tolerances. The configuration of the first member 256 can form a lubricant flow surface 262 that can facilitate migration of lubricant, as discussed herein. The first member 256 can include a first part and a second part, one each that extends from the back side 236 of the central portion 246 and the front side 234 of the central portion 248, respectively. On the first part, the lubricant guide member 222 can include a flow tab 264, which can also facilitate capture and migration of lubricant. This disclosure also contemplates configurations for the first member 256 wherein the first part and the second part are configured to extend along the longitudinal axis 238 on one, both, or either the front side 234 and the back side 236 of the central portion 246, as desired.

The second member 258 is configured in spaced relation to, or is spaced longitudinally apart from, the central portion 246 of the body member 244 (along the longitudinal axis 238). The spacing can be measured from a plane that is tangent to at least two points on a surface of the second member 258 and a plane that is tangent to at least two points on a surface of the central portion 246. Typically, the first plane and the second plane are parallel; however this configuration is not always the case. In one embodiment, the second member 258 extends in a direction generally downwardly from the first member 256 (also, transversely below the first member 256), in a direction along the centerline 252 toward the bottom of the body member 244.

The second member 258 can also have a secondary attachment feature 266 that is configured to facilitate mating with adjoining components of the lubricating system 102 (FIGS. 2 and 3). The secondary attachment feature 266 can comprise one or more thru-holes or openings that penetrate the second member 258. These holes can be equally spaced on opposite sides of the centerline 252, although the position and construction of the holes may depend on corresponding holes found on components of the lubricating system 102 (FIG. 3). In one example, the thru-holes receive fasteners (e.g., bolts) that permit the lubricant guide member 222 to be bolted directly to the bearing carrier member 128 (FIGS. 2 and 3).

Figure 6:
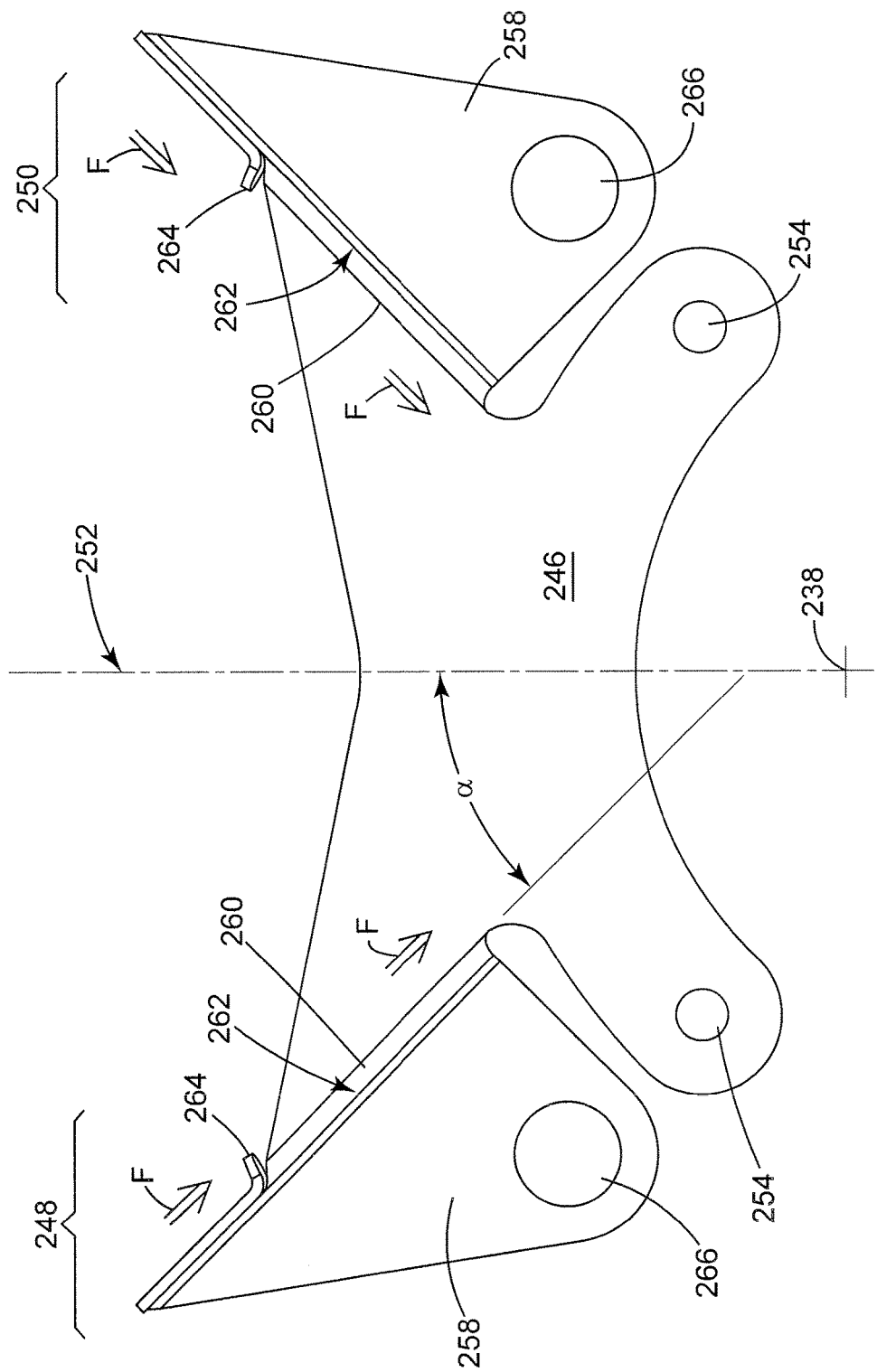
FIG. 6 depicts a front view of the lubricant guide member of FIG. 5.

As best shown in FIG. 6, the lubricant flow surface 262 slopes (and/or tapers) at an angle α with respect to each of the longitudinal axis 238 and the centerline 252. Generally, the angle α configures the slope of the lubricant flow surface 262 to taper inwardly (i.e., toward the centerline 252) and downwardly (i.e., toward bottom of the lubricant guide member 222). This configuration directs a fluid towards the centerline 252 and the top of the bearing clamp member 220 (FIG. 4). In one example, the angle α is in a range between about 20 and about 60 degrees. When implemented in the lubricant reservoir component 242 (FIG. 4), the lubricant flow surface 262 at least partially enables the passive, gravity-assisted lubricant return mechanism to capture and direct lubricant toward the center of the lubricant guide member 222. For purposes of example, one implementation of the lubricant guide member 222 utilizes the side members 248, 250 to direct a fluid lubricant F down the lubricant flow surface 262 towards the central portion 246. In one example, the lubricant can flow down the lubricant flow surface 262 to the reservoir region 240 of the bearing clamp member 220, shown in FIG. 4 and discussed in more detail below.

Figure 7:
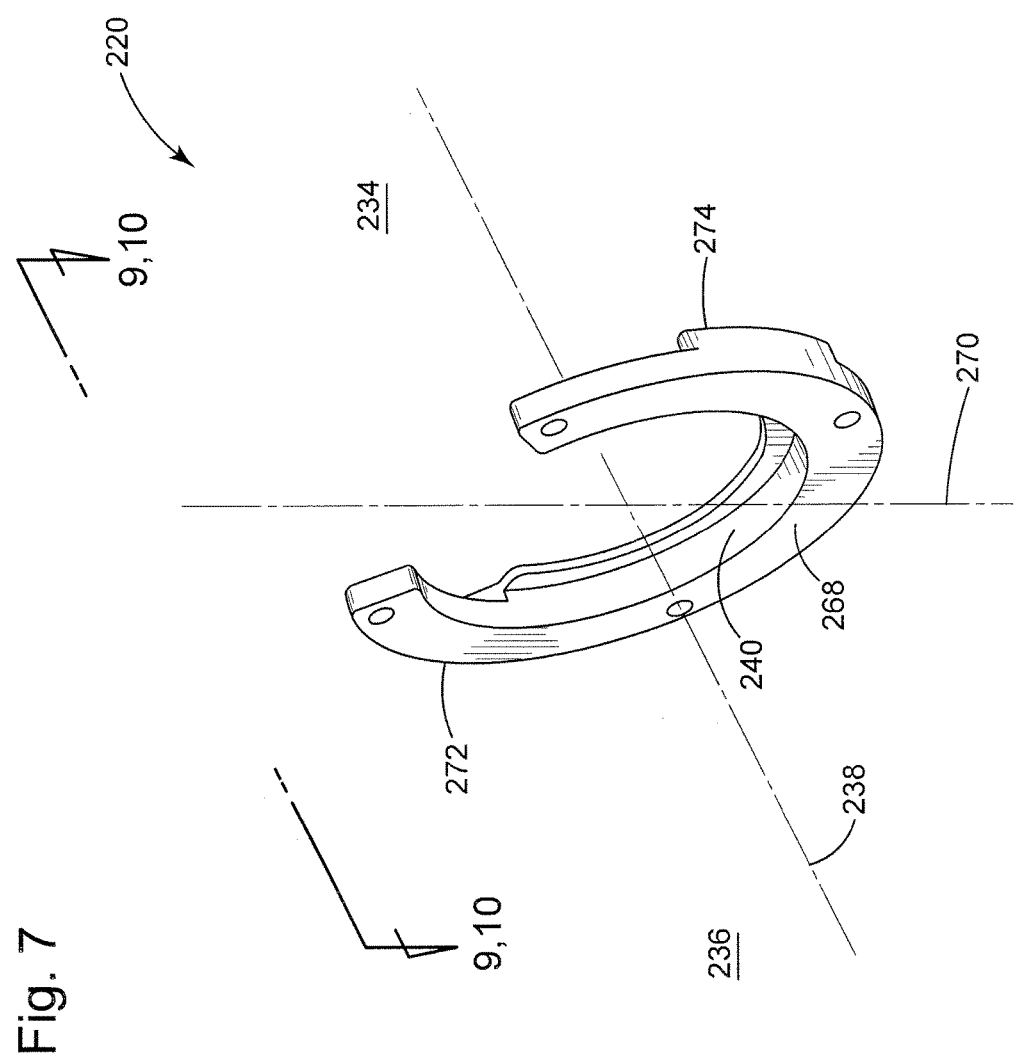
FIG. 7 depicts a back, perspective view of an exemplary embodiment of a lubricating assembly with focus on an example of a bearing clamp member.
Figure 8:
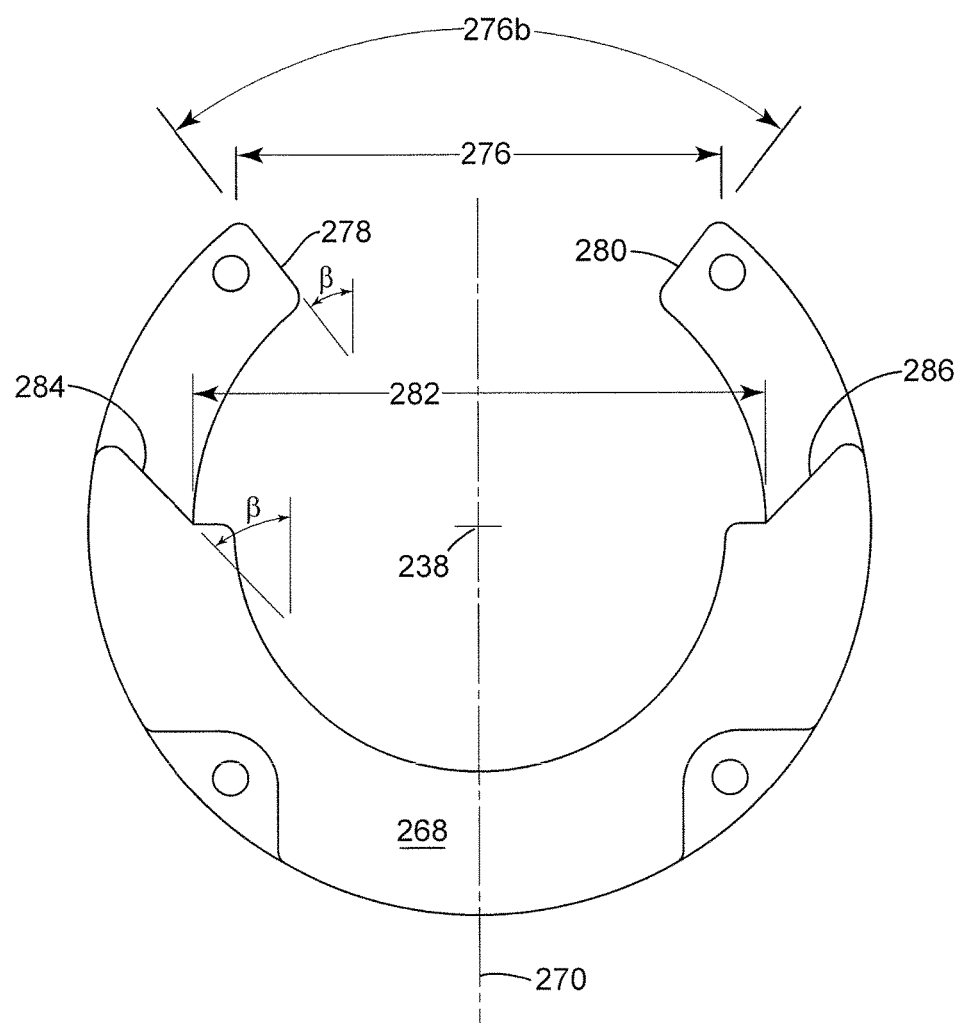
FIG. 8 depicts a front view of the bearing clamp member of FIG. 7.
Figure 10:
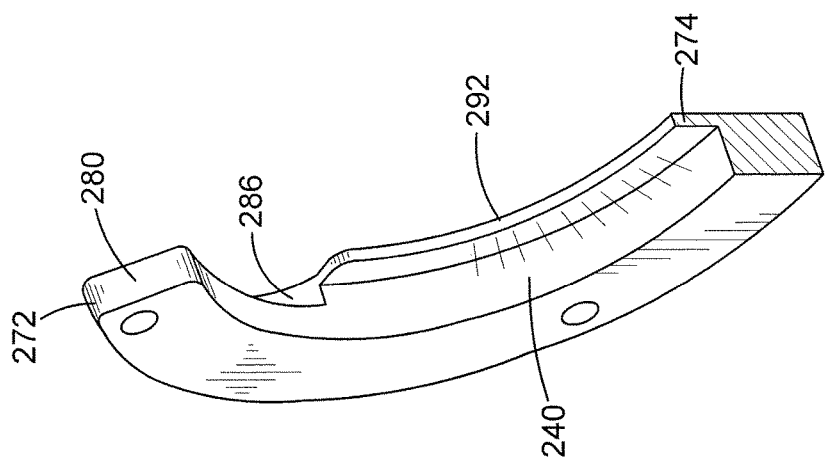
FIG. 10 depicts a perspective, cross-section view of the bearing clamp member of FIG. 7 taken at line 10-10.
Figure 9:
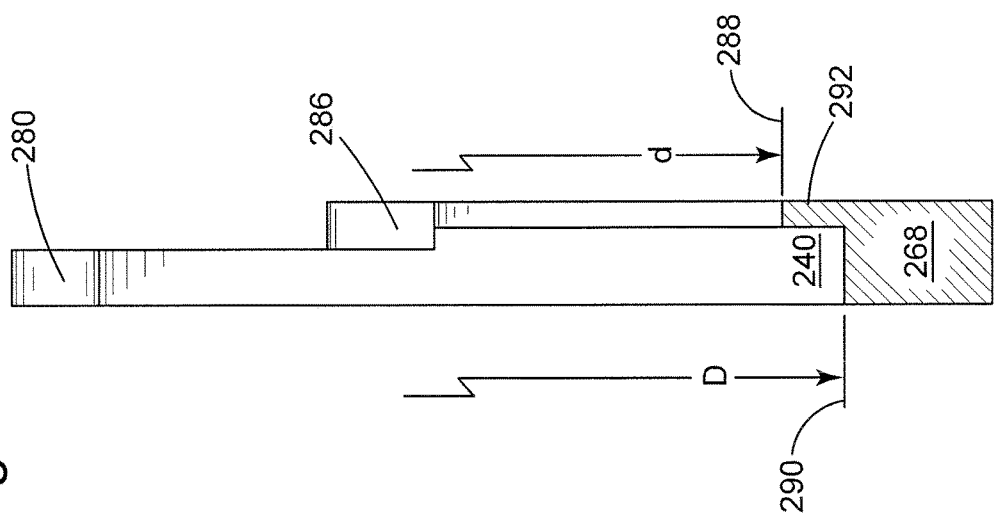
FIG. 9 depicts a side, cross-section view of the bearing clamp member of FIG. 7 taken at line 9-9.
Figure 11:
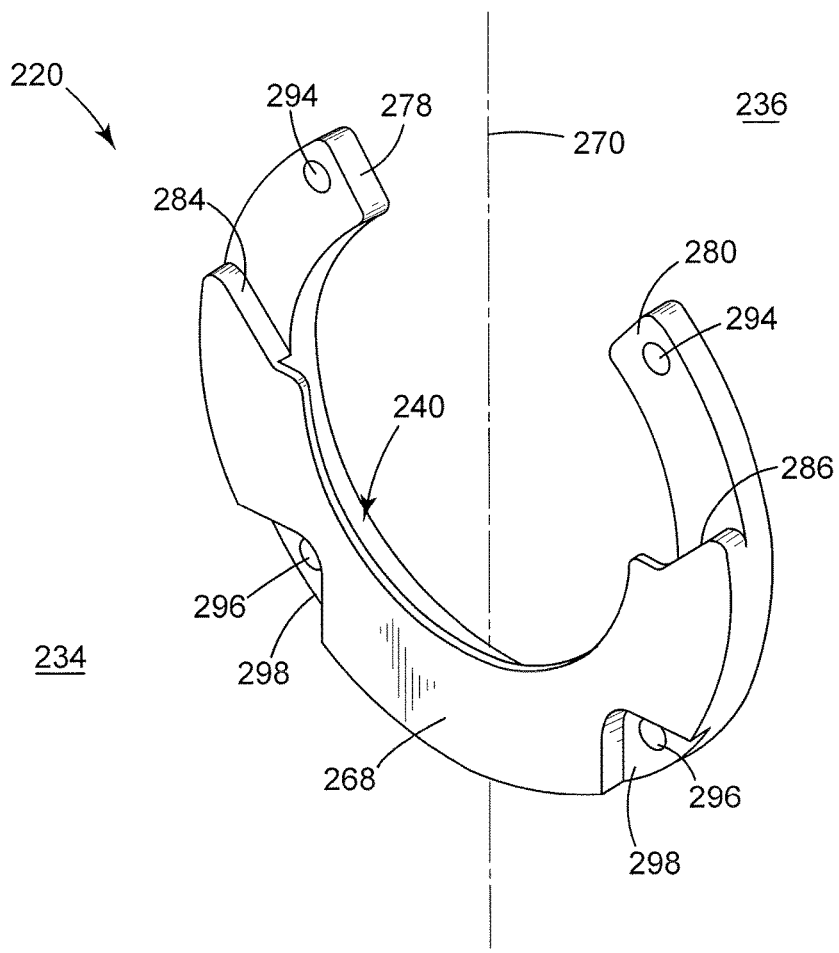
FIG. 11 depicts a front, perspective view of the bearing clamp member of FIG. 7.

FIGS. 7, 8, 9, 10, and 11 depict an example of the bearing clamp member 220 (also "flange 220"). FIG. 7 provides a perspective view of the bearing clamp member 220 from the back side 236. FIG. 8 depicts an elevation view of the bearing clamp member 220 taken from the front side 234. FIGS. 9 and 10 provide a side view and a perspective view, respectively, of a cross-section taken at lines 9-9 and 10-10 of FIG. 7. FIG. 11 depicts a perspective view of the bearing clamp member 220 from the front side 234.

With reference to FIGS. 7 and 8, the bearing clamp member 220 includes a clamp body 268 with an outer peripheral side or edge having a generally annular profile that at least partially circumscribes the longitudinal axis 238. The annular profile may have a centerline 270 that bisects the clamp body 268. Broadly, the illustrated embodiment has a horseshoe shape with the top of the clamp body 268 being open to facilitate capture of lubricant. The "open-top" feature represents a departure from conventional devices in which the bearing clamp is formed as a solid ring, which in design theory is meant to provide uniform distribution of stresses.

Moving from the back side 236 to the front side 234, the clamp body 268 may have a pair of annular sections (e.g., a first annular section 272 and a second annular section 274), each defining different features for the annular profile of the clamp body 268. In one example, the second annular section 274 is longitudinally adjacent the first annular section 272. In FIG. 8, the annular profile of the first annular section 272 may define a first lubricant inlet zone 276 between a pair of clamp surfaces (e.g., a first clamp surface 278 and a second clamp surface 280) that are disposed in opposing relation about the centerline and are annularly spaced apart from one another to form a first annular gap or first annular void (also, "first opening") in the annular profile. Similarly, the annular profile of the second annular section 274 may define a second lubricant inlet zone 282 formed between a pair of clamp surfaces (e.g., a third clamp surface 284 and a fourth clamp surface 286) disposed in opposing relation about the centerline and annularly spaced apart from one another to form a second annular gap or second annular void (also, "second opening") in the annular profile. In one example, the second annular gap is larger than the first annular gap. In one example, the first clamp surface 278 and the second clamp surface 280 taper downwardly toward the reservoir region in a direction from the outer peripheral edge to the centerline. In one example, the third clamp surface 284 and the fourth clamp surface 286 taper downwardly toward the reservoir region in a direction from the outer peripheral edge to the centerline.

The open sections of the inlet zones 276, 282 facilitate migration of lubricant to the reservoir region 240 (FIG. 7). The open section of the first lubricant inlet zone 276 allows a greater volume of the lubricant fluid 116 (FIG. 1) to funnel into the reservoir region 240 for more effective lubricant management. The open section of the second lubricant inlet zone 282 may provide a supplementary means of funneling the lubricant into the reservoir region 240. In the illustrated embodiment, the second lubricant inlet zone 282 is configured to capture lubricant fluid flowing down the front side 234 of the lubricant guide member 222, in between the flow tabs 264 of the lubricant guide member 222 shown in FIG. 5.

As also shown in FIG. 8, the clamp surfaces 278, 280, 284, 286 may slope (and/or taper) at an angle β. Generally, the angle β configures the slope of the clamp surfaces 278, 280, 284, 286 to taper inwardly (i.e., toward the centerline 270) and downwardly (i.e., toward reservoir region 240 (FIG. 7) at the bottom of the clamp member 220) in a direction from the outer peripheral edge to the centerline 270 (FIG. 7). In one example, the angle β of one or more of the clamp surfaces 278, 280, 284, 286 is in a range between about 20 and about 60 degrees from vertical (i.e., from the center line 270). In operation, this slope can facilitate the passive, gravity-assisted lubricant return mechanism to effectively direct lubricants from the lubricant guide member 222 toward the reservoir region 240 (FIG. 7) for use in lubricating rotating members of the system 102 (FIG. 3).

As best shown in FIGS. 9 and 10, the inside of the clamp body 268 may define a bore configuration with bores of different diameters (e.g., first bore 288 and second bore 290). The bores 288, 290 may be concentric with one another. In one example, the first bore 288 penetrates through the clamp body 268, forming an opening that can receive the shaft of the lubricating system. This opening allows the lubricant reservoir component to fit onto the shaft member. In one example, the diameter d of the first bore 288 may be less than the diameter D of the second bore 290. In this manner, the adjoining bores 288, 290 form a first peripheral wall 292. The peripheral wall 292 can form a boundary and/or front dam that bounds the reservoir region 240 at the bottom of the clamp body 268. It is in this reservoir region 240 where lubricant can reside, e.g., when the bearing clamp member is in position against the bearing assembly 126 (FIGS. 2 and 3). In one example, the bearing carrier member 128 (FIGS. 2 and 3) will form a back dam (also, "second peripheral wall") to prevent the lubricant from evacuating the reservoir region 240.

In FIG. 11, the clamp body 268 may define one or more access holes (e.g., first access holes 294 and second access holes 296) and corresponding reliefs 298 about the second access holes 296. These features can serve to allow the bearing clamp member 220 to mount to other members in the lubricating assembly 100. For example, the first access holes 294 can match, or align, with corresponding holes on the lubricant guide member 222 (FIGS. 5 and 6). The second access holes 296 can match, or align, with corresponding holes on the bearing carrier member 128 (FIG. 3). The reliefs 298 can penetrate into the clamp body 268 to a depth, measured from a first surface of the clamp body 268 on the front side 234 to a second surface of the clamp body 268 on the back side 236. This depth can be configured to prevent a fastener from protruding beyond the first surface of the bearing clamp member on the first side 234.

The bearing clamp member 220 may be fabricated from any material suitable for the environment, for example aluminum and/or steel bar stock. These materials may be amenable to machining, bending, welding, and like manufacturing techniques. Such fabrications should carefully consider the geometry of the bearing clamp member 220 in light of its use and function to "clamp" components in the broader assembly. As noted above, for example, the bearing clamp member 220 must maintain sufficient strength (and like physical properties) to appropriately carry and/or distribute stresses. Accordingly, the arc (e.g., width) of the first annular gap for the lubricant inlet zone 276, shown as 276b in FIG. 8, is bounded at a low limit and a high limit. The low limit may reflect the requirement to optimize the part for sufficient lubrication. On the other hand, the high limit may reflect the requirement to handle particular stress and/or result in particularly advantageous stress distribution patterns.

More broadly, and with reference also to the preceding FIGS. 4, 5, and 6, construction of the lubricant reservoir component 242 may be formed in a variety of ways. The lubricant reservoir component 242 may, for example, utilize a construction in which the bearing clamp member 220 and the lubricant guide member 222 are separate pieces. In such construction, the lubricant guide member 222 can be formed of one or more bent and/or welded metals segments. However, other constructions of the lubricant reservoir component 242 may benefit from the bearing clamp member 220 and the lubricant guide member 222 being formed monolithically and/or unitary, as a single piece. This construction may utilizes sheet metal (and/or like thin materials of substantially uniform thickness) and/or more robust stock material that is machined to form the various features for bearing clamp member 220 and the lubricant guide member 222 discussed herein.

Figure 12:
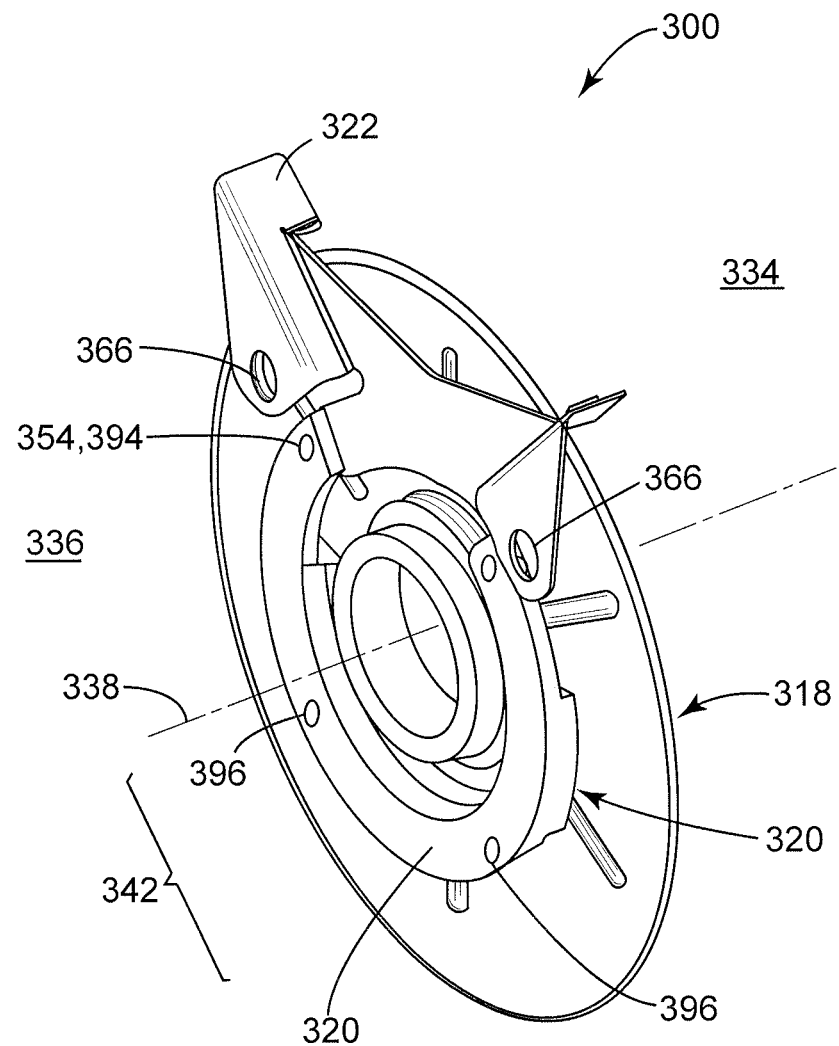
FIG. 12 depicts a perspective view of an exemplary embodiment of a lubricating assembly.

FIG. 12 illustrates an exemplary embodiment of a lubricating assembly 300. Here, the primary attachment feature 354 of the lubricant guide member 322 is configured to align with the access holes 394 (also, "first set" of access holes) on the bearing clamp member 320. Cap screws (not shown) may be used fasten these two components (e.g., the lubricant guide member 322 and the bearing clamp member 320) thus forming the lubricant reservoir component 342. In one implementation, the lubricant reservoir component 344 can secure to the bearing carrier member 128 (FIG. 3) via access holes 396 (also, "second set" of access holes). This implementation locates the second side of the bearing clamp member 320 to reside proximate the bearing carrier member 128 (FIG. 3). Here, the bearing carrier member 128 (FIG. 3) is configured to form the second peripheral wall that is spaced part from the first peripheral wall by the reservoir region. Reliefs, which are hidden from view, prevent the heads of cap screw inserted into the access holes 396 on the first side from protruding beyond the outer most surface of the bearing clamp member 320 on the front side 334. Additionally, the lubricant guide member 322 may be bolted directly to the bearing carrier member 128 (FIGS. 2 and 3) using the secondary attachment feature 366 (thru-holes).

The combination of the bearing clamp member 320 and the lubricant guide member 322 forms the lubricant reservoir component 342 that effectively channels excess lubricant into the reservoir region 340. The illustrated embodiments are well-suited for incorporation into existing compressors as a retrofit. However, the illustrated structure is exemplary in nature and is not intended to be limiting. For example, features of the bearing clamp member 320 and/or the lubricant guide member 322 may be formed integrally or otherwise arranged into a single structure, or may be incorporated into existing structures such as the bearing carrier member 128 (FIGS. 2 and 3), for example, to avoid the need for bolts or fasteners. In one example, the clamp body of the bearing clamp member and the body member of the lubricant guide member are formed integrally.

In view of the foregoing, the improvements to the clamp member of the present disclosure offers several improvements over conventional lubricating devices found in compressors and related machinery. One of the improvements of the present disclosure is the addition of the reservoir region to capture and pool excess lubricant fluid and increase its availability to the rolling bearing elements. Another improvement is the addition of lubricant inlet zones to allow more lubricant to flow into the reservoir region for better reservoir management. The lubricant inlet zones increase oil entrance area by as much as 100% over conventional designs.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lubricant reservoir component for a splash lubrication oil system, said lubricant reservoir component comprising:
   a bearing clamp member having a clamp body with a top, a bottom, and an outer peripheral edge that forms an annular profile that circumscribes a central longitudinal axis, the clamp body having a first annular section forming a first opening in the annular profile at the top of the clamp body, the clamp body further having a first bore and a second bore aligned on the central longitudinal axis, the first bore forming an opening in the clamp body, wherein the first bore and the second bore have, respectively, a first diameter and a second diameter that is larger than the first diameter so as to form a first peripheral wall that bounds a reservoir region at the bottom of the clam body.

2. The lubricant reservoir component of claim 1, wherein the clamp body has a first clamp surface and an opposing second clamp surface in the first annular section that are annularly spaced apart from one another to form the first opening at the top of the clamp body, wherein the first clamp surface and the second clamp surface taper downwardly in a direction from the outer peripheral edge toward the reservoir region.

3. The lubricant reservoir component of claim 1, wherein the clamp body has a second annular section that is longitudinally adjacent to the first annular section along the central longitudinal axis, and wherein the second annular section forms a second opening in the annular profile.

4. The lubricant reservoir component of claim 3, wherein the clamp body has a third clamp surface and an opposing fourth clamp surface in the second annular section that are annularly spaced apart from one another to form the second opening, and wherein the third clamp surface and the fourth clamp surface taper downwardly in a direction from the outer peripheral edge toward the reservoir region.

5. The lubricant reservoir component of claim 3, wherein a linear distance between edges defining the second opening is larger than a linear distance between edges defining the first opening.

6. The lubricant reservoir component of claim 1, further comprising a lubricant guide member that is configured to couple at the top of the bearing clamp member, wherein the lubricant guide member is configured to direct lubricant toward the reservoir region at the bottom of the clamp body.

7. The lubricant reservoir component of claim 6, wherein the lubricant guide member comprises a body member and a pair of side members disposed on either side of a centerline, the side members forming a lubricant flow surface that tapers downwardly toward the bottom of the clamp body.

8. A compressor, comprising:
   a splash lubricating system with a shaft member with a central longitudinal axis and a lubricant reservoir component configured to fit onto the shaft member, the lubricant reservoir component comprising a clamp body with a top, a bottom, and an outer peripheral edge that forms an annular profile that at least partially circumscribes the central longitudinal axis of the shaft member, the clamp body having a first bore with a first diameter and a second bore concentric with the first bore, the second bore having a second diameter, wherein the first diameter is less than the second diameter so as to from a first peripheral wall that bounds a reservoir region disposed at the bottom of the clamp body and at least partially below the shaft member and wherein the clamp body has a first clamp surface and an opposing second clamp surface that are annularly spaced apart from one another to form the first annular gap in the annular profile at the top of the clamp body.

9. The compressor of claim 8, wherein the first clamp surface and the second clamp surface taper downwardly in a direction from the outer peripheral edge toward the reservoir region.

10. The compressor of claim 8, wherein the clamp body has a third clamp surface and an opposing fourth clamp surface that are annularly spaced apart from one another to form a second annular gap in the annular profile.

11. The compressor of claim 10, wherein the third clamp surface and the fourth clamp surface taper downwardly toward the reservoir region in a direction from the outer peripheral edge to the centerline.

12. The compressor of claim 10, wherein a linear distance between edges defining the second opening is larger than a linear distance between edges defining the first opening.

13. The compressor of claim 8, further comprising a bearing assembly with a bearing carrier member, wherein the clamp body is configured to couple with the bearing carrier member to position the bottom of the clamp body proximate the bearing carrier member, and wherein the bearing carrier member is configured to form a second peripheral wall that is spaced part from the first peripheral wall by the reservoir region.

14. The compressor of claim 13, wherein the clamp body has one or more access holes that are configured to align with corresponding holes on the bearing clamp member.

15. The compressor of claim 14, wherein the clamp body has a first side and a second side, wherein the second side is configured to reside proximate the bearing carrier member, wherein the first side has a least one relief that penetrates into the clamp body to a depth as measured from a first surface of the clamp body on the first side, and wherein the depth is configured to prevent a fastener disposed in the one or more access holes from protruding beyond the first surface of the clamp body on the first side.

16. The compressor of claim 8, further comprising a lubricant guide member that is configured to couple at the top of the clamp body at points on each side of the first annular gap in the annular profile, the lubricant guide member configured to direct lubricant toward the reservoir region at the bottom of the clamp body.

17. The compressor of claim 16, wherein the lubricant guide member comprises a body member and a part of side members disposed on either side of the centerline, the side members forming a lubricant flow surface that tapers downwardly towards the reservoir region at the bottom of the clamp body.

* * * * *